Aug. 13, 1963 E. A. GUTBIER 3,100,471

MASS STREAM SOLDERING MACHINE

Filed July 1, 1959 5 Sheets-Sheet 1

INVENTOR
E.A. GUTBIER
By [signature]
ATTORNEY

INVENTOR
E. A. GUTBIER
By W. A. Johnson
ATTORNEY

Aug. 13, 1963 E. A. GUTBIER 3,100,471

MASS STREAM SOLDERING MACHINE

Filed July 1, 1959 5 Sheets-Sheet 3

INVENTOR
E. A. GUTBIER
By W. A. Johnson
ATTORNEY

INVENTOR
E. A. GUTBIER
By
ATTORNEY

Aug. 13, 1963

E. A. GUTBIER 3,100,471

MASS STREAM SOLDERING MACHINE

Filed July 1, 1959

5 Sheets-Sheet 5

INVENTOR
E. A. GUTBIER
By W. A. Johnson
ATTORNEY

United States Patent Office 3,100,471
Patented Aug. 13, 1963

3,100,471
MASS STREAM SOLDERING MACHINE

Ernst A. Gutbier, Danvers, Mass., assignor to Western Electric Company, Incorporated, New York, N.Y., a corporation of New York Filed July 1, 1959, Ser. No. 824,326
7 Claims. (Cl. 113—126)

This invention relates to soldering apparatus, particularly apparatus for soldering component leads to undersurface conductors of wiring boards.

One of the advantages of using wiring boards in the assembly of electronic equipment is their adaptability to mass production soldering techniques. Some of these soldering methods known in the art are generally described as dip soldering, jet soldering, and fountain soldering. However, there are certain problems or disturbing conditions existing with these methods resulting in the lack of control of the application of the molten solder and/or the control and timing of the movement of the wiring boards relative to the solder bath.

The object of the present invention is to produce a more efficient and practical apparatus for soldering component leads to undersurface conductors of wiring boards.

According to the object, the apparatus for soldering component leads to undersurface conductors of wiring boards, comprises a channel through which travels a stream of molten solder of a given depth and a carriage for removably supporting a wiring board for movement between a loading position and a position wherein the component lead connections, with the undersurface conductors of the wiring board, are submerged in the stream.

An important feature of the apparatus is the controlling means for the movement of the wiring board relative to the stream, to submerge, in the continuously flowing stream of molten solder, the parts to be soldered and particularly, during removal of the board from the stream, to move the board at an angle tilting it upwardly from the front end facing the stream so that a roll of the molten solder created by the front end of the wring board will move beneath the wiring board as it is tilted upwardly to create a wiping or washing action on the undersurface conductors and leads.

Other objects and advantages will be apparent from the following detailed description when considered in conjunction with the accompanying drawings wherein.

Figures 7, 8, 9:
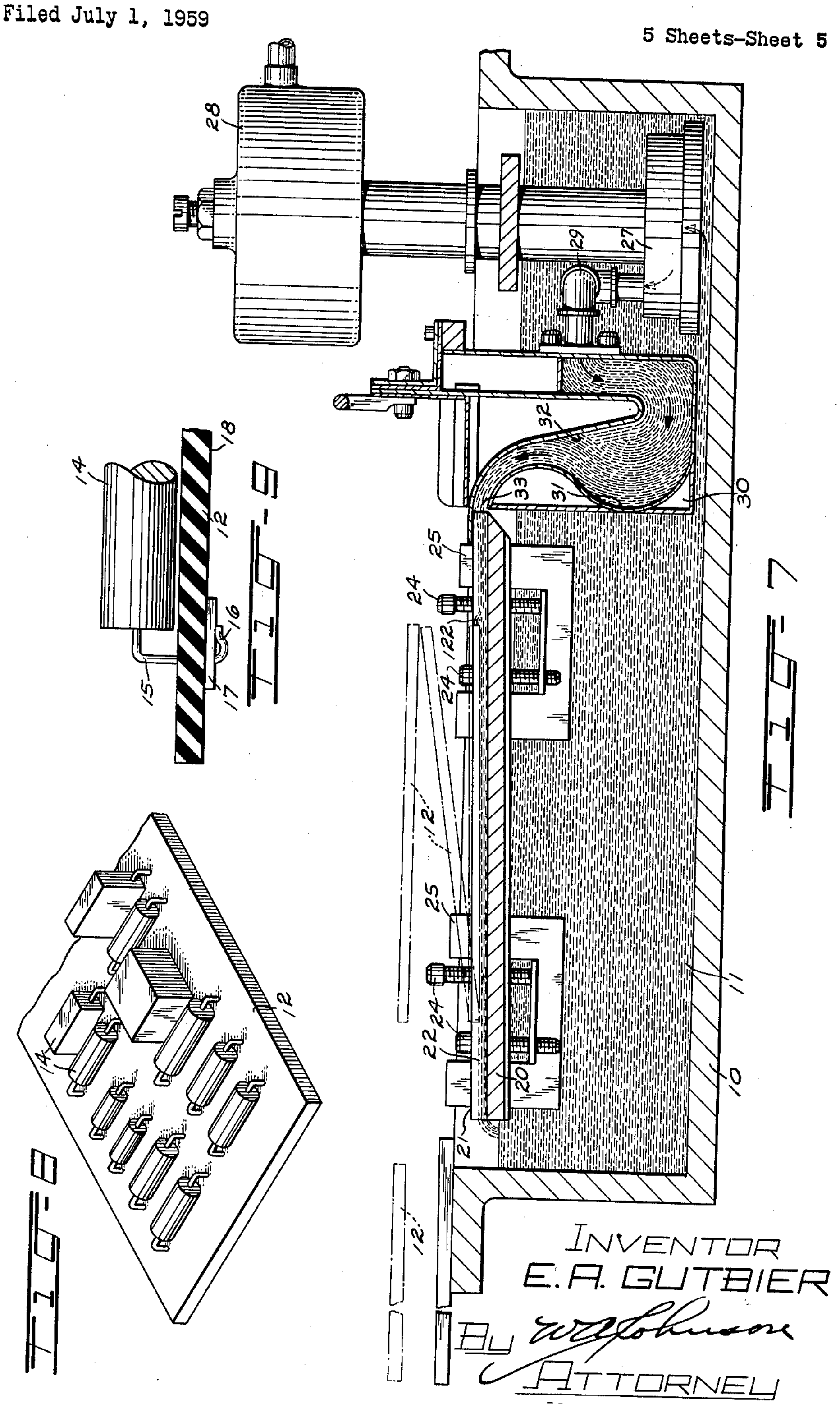
FIG. 7 is a vertical sectional view particularly of the solder controlling means, this view being taken substantially along the line 7—7 of FIG. 1.
FIG. 8 is a fragmentary isometric view of a wiring board illustrating components mounted on the top surface thereof.
FIG. 9 is a fragmentary sectional view of a portion of a wiring board illustrating the mechanical and electrical attachment of the leads of components to the board.

The structure shown in FIG. 7 is disposed somewhat in the heart of the apparatus and includes a tank 10 for a supply 11 of molten solder, the solder being maintained in its molten free-flowing state by suitable heating means, not shown. The tank 10 is of a given width depending on the width of wiring boards 12. The wiring boards 12 in the present instance have components 14 with leads 15 extending through apertures in the board and bent as at 16 to engage predetermined portions of conductors 17 mounted on, or partially imbedded in, the undersurface 18 of the wiring board.

Figure 1:
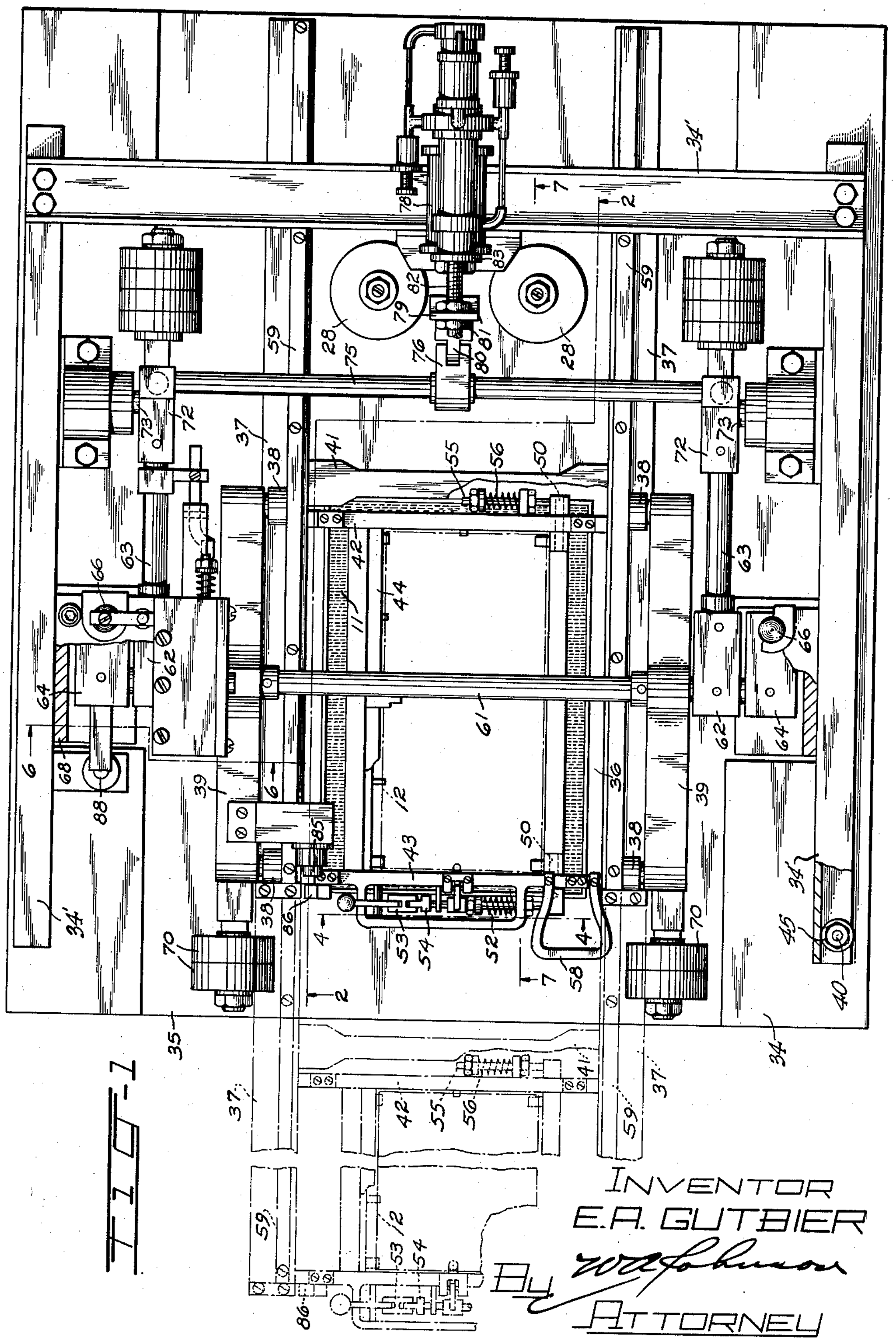
FIG. 1 is a top plan view of the apparatus.

A channel 20 is open at both ends and having sides 21 of heights greater than the depth of a stream 22 of the molten solder which is to flow through the channel. In the present illustration, the channel slopes downwardly from its entrance end to its exit end and the degree of slope may be varied by adjustment of two sets of regulating screws 24 disposed upon each side of the channel. The screws 24 serve not only to connect the channel 20 with supporting brackets 25, but cooperate with these brackets in adjusting the angle of slant of the channel. The molten solder forming the stream 22 is removed from the bottom portion of the supply 11 by pumps 27 driven by motors 28. In the present instance, there are two pumps 27 and two motors 28, as illustrated in FIG. 1, the purpose being to force the molten solder through spaced lines 29 into a chamber 30 which is as long as the channel is wide. The flow of the molten solder in the chamber 30 will be controlled by the contours of inner walls 31 and 32 which form an outlet 33 equal in width to the adjacent entrance end of the channel. The speed of rotation of the motors 28 and the driving speed of the pumps 27 control the depth of the stream 22 flowing through the channel.

The tank 10 for the supply of solder 11 is mounted beneath a frame structure 35 which is the main support for the tank and the other mechanical means of the apparatus. The frame structure is composed of a fixed lower or base portion 34 and an upper portion 34′ adjustable by numerous threaded supports 40 fixed to the base portion 34 and having nuts 45 to support the upper portion 34′ at a deisred angle with respect to a horizontal plane and parallel with the channel 20. The holding means for the wiring board is a carriage 36, having angle members 37 fixed to the sides thereof and movable longitudinally between pairs of supporting rollers 38 of a cradle 39 from the soldering position, shown in solid lines in FIG. 1, to the loading position shown in broken lines. The purpose of the carriage is to receive a wiring board at the loading position over a table (not shown) and then move the wiring board to the soldering position above the channel where actuation of the cradle 39 will impart movements to the carriage to move the wiring board into and out of the channel.

Figure 4:
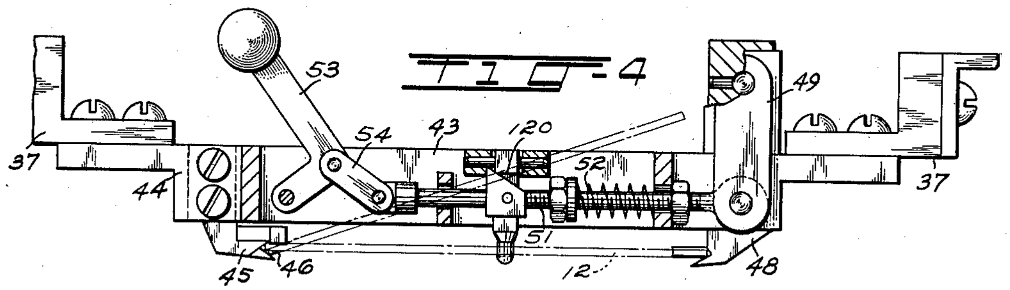
FIG. 4 is a vertical sectional view taken along the line 4—4 of FIG. 1 illustrating the board holding means in closed position.
Figure 5:
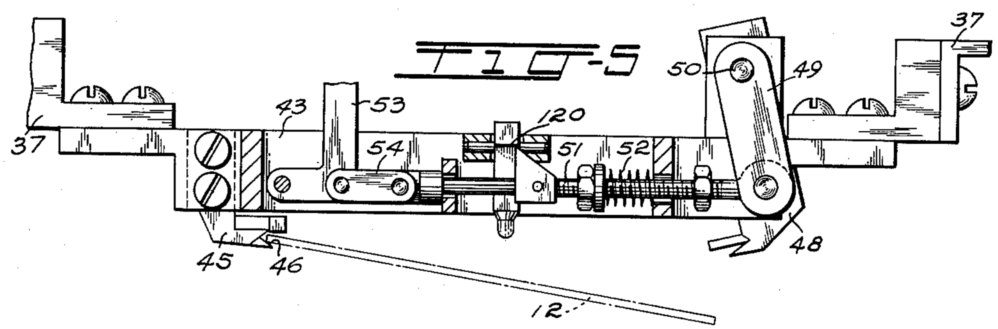
FIG. 5 is a view of the structure shown in FIG. 4 illustrating the holding means in open position.

For the structure of the carriage, attention is directed to FIGS. 1, 4 and 5 where the angle members 37 are shown secured together by cross members 41, 42, and 43. A longitudinal member 44, having its ends secured to the horizontal members 42 and 43, carries spaced fixed position holders 45 with tapered surface portions 46 to engage the adjacent side edge of each wiring board 12.

Movable holders 48, mounted at spaced positions on a rocking element 49 pivotally supported at 50, are moved into and out of engagement with the other edge of the wiring board. The actuating means for the movable holders 48 includes a rod 51 normally urged to the left, FIG. 5, by a spring 52 and actuable by a hand lever 53 through the aid of a link 54 into open and closed positions. The link 54 has its ends respectively pivotally connected to the lever 53 and the adjacent end of the rod 51. A similar rod 55, shorter in length but under the control of a spring 56, cooperates with the spring 52 to move the holders 48 into closed positions.

A handle 58, mounted on the carriage, is used in moving the carriage in the cradle between the loading and soldering positions. Guides 59, mounted in pairs on the angle members 37 on both the top surfaces and the bottom surfaces of the members, are positioned to be engaged by the inner ends of the rollers 38 to limit movement of the carriage in the cradle in a given path.

Figure 6:
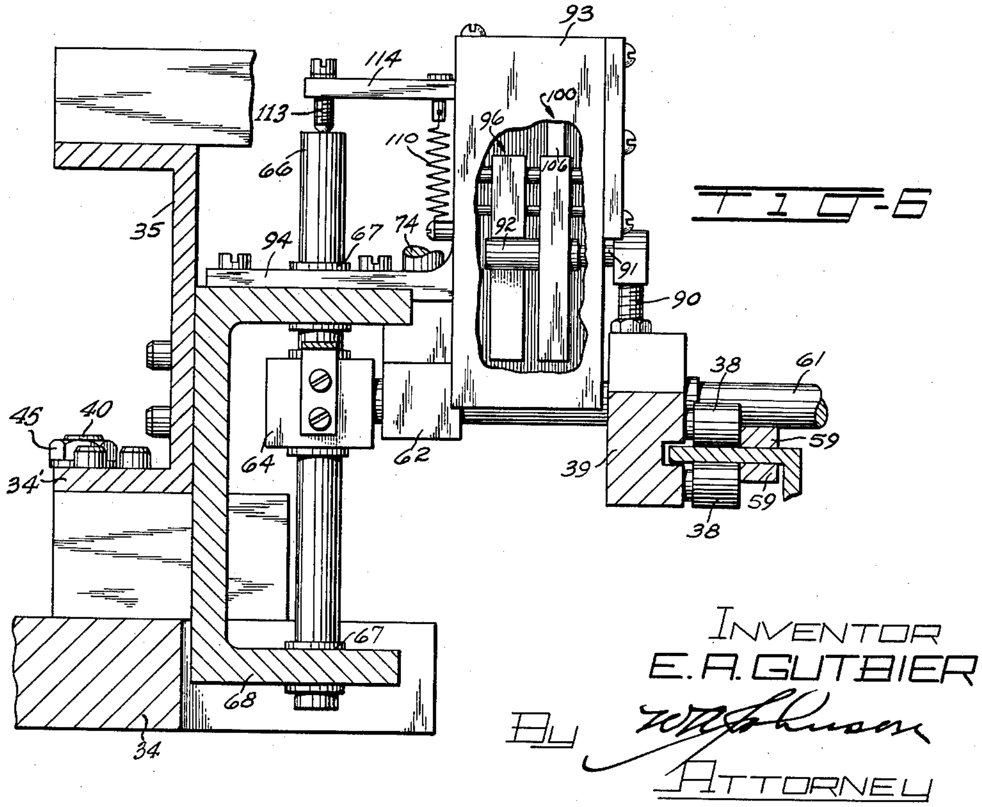
FIG. 6 is a fragmentary vertical sectional view taken along line 6—6 of FIG. 1.

The cradle 39 is composed of the roller carrying side members secured at predetermined spaced positions by a rod 61. The outer ends of the rod 61 extend through bearings, not shown, in the outer ends 62 of lateral arms 63 and have block-like members 64 mounted on the extreme outer ends thereof. The members 64 have guide rods 66 extending therethrough and fixed thereto. The rods 66 extend through bushings 67, FIG. 6, in parallel legs of C-shaped members 68 to move vertically therein during vertical movement of the rod 61.

The cradle 39 has weights 70 mounted at the forward end thereof serving somewhat to counterbalance the weight carried by the cradle including the carriage when the carriage is in the soldering position.

The means for moving the cradle vertically, to move the wiring board with the carriage relative to the channel, includes rocking member 72 pivotally mounted on aligned spindles 73 which are supported by bearings supported by the main frame. The rocking members 72 have the lateral arms 63 fixed thereto. Vertical arms 74 of the rocking members 72 are connected by a rod 75 which is joined through a link 76 to a piston rod 77 of an air cylinder 78. An adjustable arm 79, bifurcated to straddle the piston rod 77 and be engaged by a member 80 fixed to the piston rod, is adjustably secured at 81 to a piston rod 82 of a dash pot unit 83 serving to control the timing of the return movement of the cradle moving means, particularly the movement of the wiring board upwardly from the stream of solder. A normally open switch 85 is fixedly mounted on the cradle 39 to be actuated by a projection 86 on the carriage 36 when moved to the soldering position. The switch 85 is in a circuit (not shown) when closed to cause operation of certain valves, to operate the air cylinder 78, to move the mechanism downwardly to lower the wiring board partially into the stream of solder. Another switch 88 is positioned to be operated at the start of the soldering period and under the control of a suitable timing unit, not shown, to cause reverse action of the air cylinder after this predetermined length of time.

The cradle has a threaded shaft 90 adjustably mounted therein and carrying a spindle 91 upon which a rotatable cam follower 92 is mounted. Two pairs of cams for the cam follower 92 are disposed in a housing 93 which is supported by a bracket 94, FIG. 6, mounted on the adjacent C-shaped member 68. One of the pairs of cams indicated generally at 96 has one cam with a short cam surface to engage the cam follower in its up position, while the other cam of this pair has a substantially straight surface 98 extending from an upper curved portion 99 to the lower end of the cam member. The counterbalanced condition of the cradle by the weights 70 causes the cam follower 92 to follow the straight surface 98.

Figure 2:
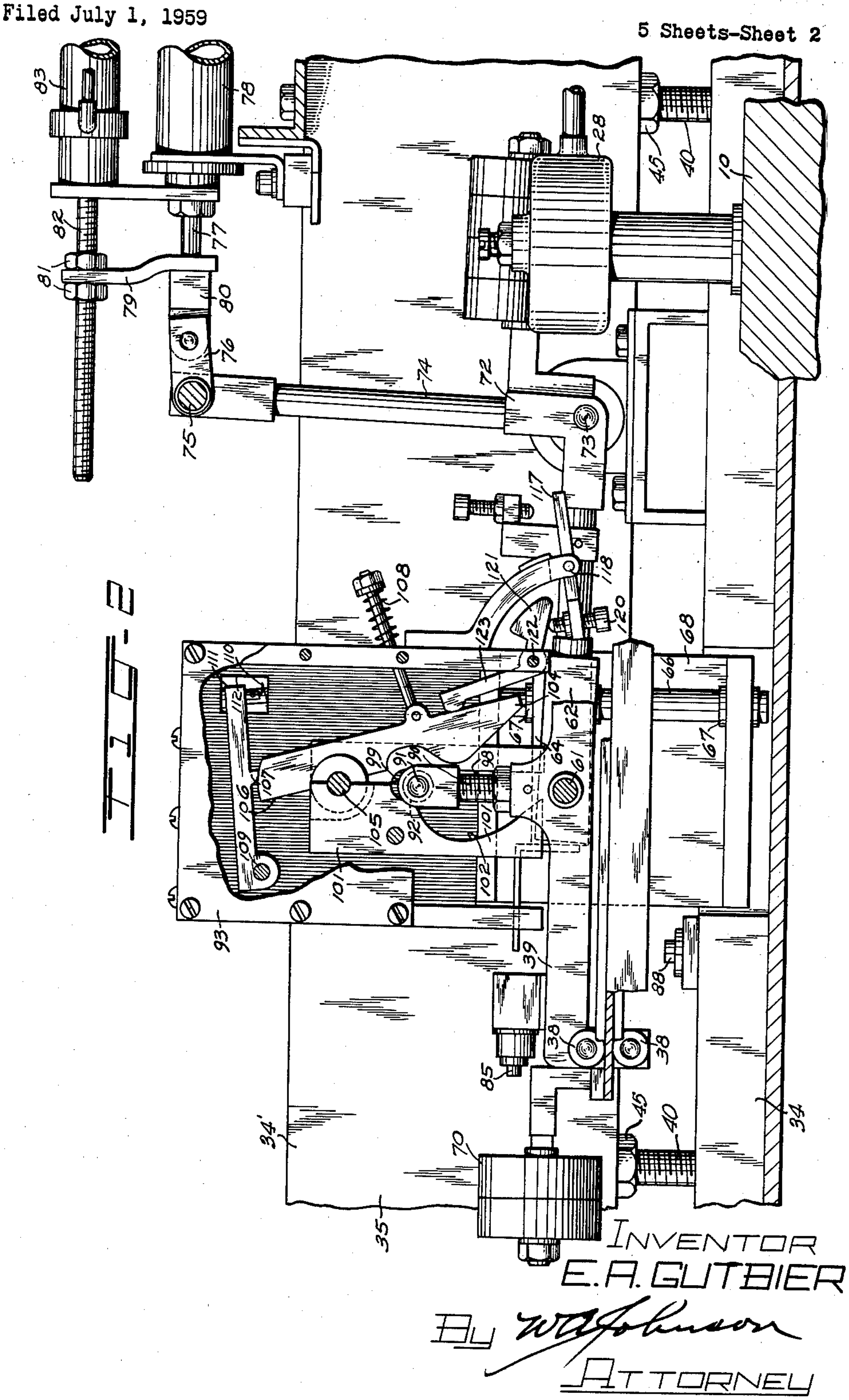
FIG. 2 is a vertical sectional view taken substantially along the line 2—2 of FIG. 1.
Figure 3:
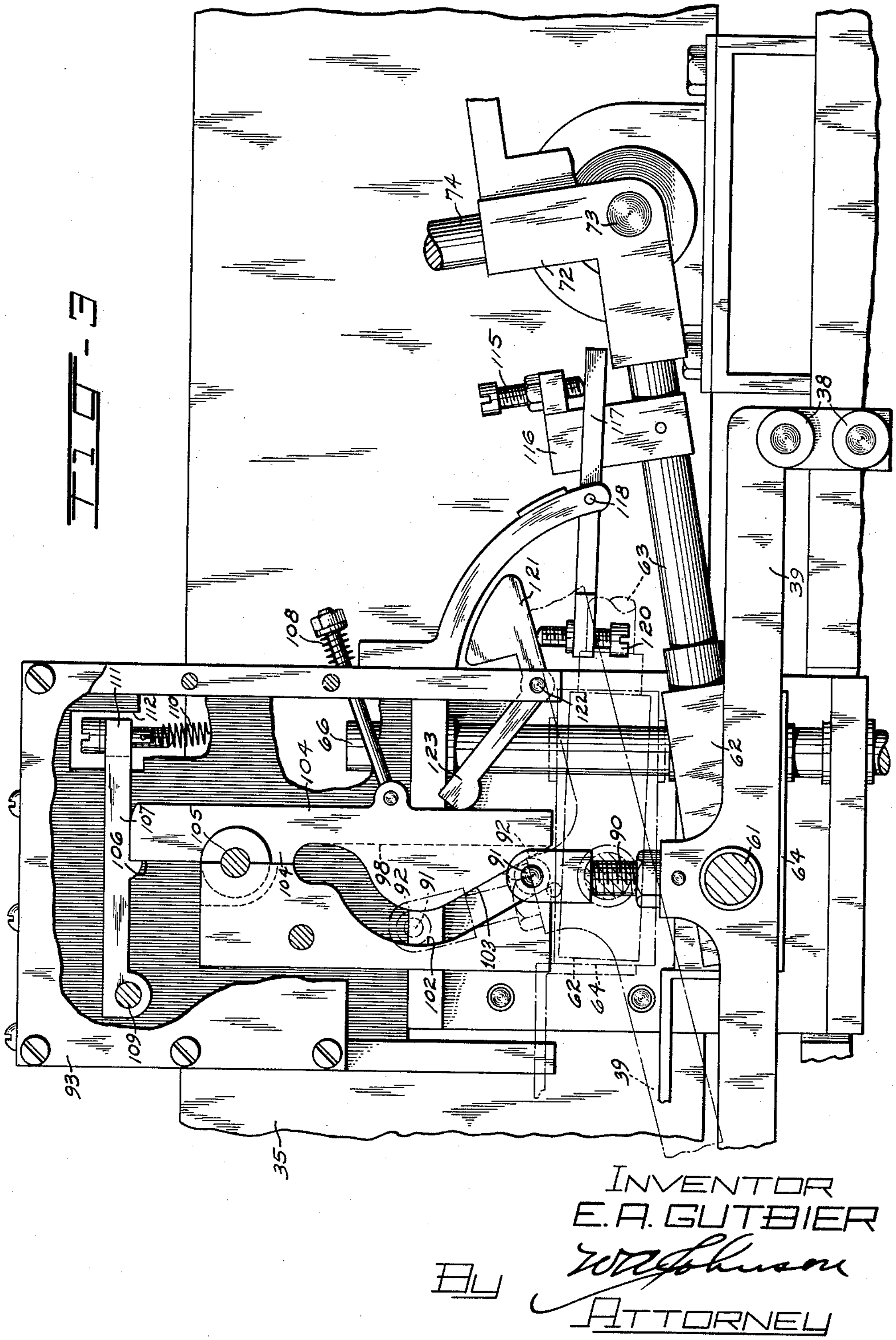
FIG. 3 is an enlarged view of a portion of the structure shown in FIG. 2 illustrating the tilting means for the wiring board.

The other pair of cam members, indicated generally at 100, includes a fixed member 101 with a curved surface 102 cooperating with a surface 103 of a movable cam member 104 to cause the cam follower 92 to move through a curved path during the up movement of the cradle. The movable cam member 104 is pivotally supported at 105 and has an upper portion 106 positioned to be engaged by a latch 107. A spring actuated rod 108 normally urges the cam member 104 into the position shown in FIG. 2 where the latch 107, supported by a pivot 109, is held by a spring 110 in engagement with the top surface of the portion 106. The latch 107 has a portion integral with the free end 111 thereof and extending laterally through an aperture 112 in the housing as indicated at 114. This portion has the spring 110 fixed thereto and carries an adjustable screw 113 to be engaged by the upper end of the adjacent rod 66 when moved to its up position to release the latch from its holding position, as shown in FIG. 3, to its released position, as shown in FIG. 2.

Means is provided to move the cam member 104 into its latched position during downward movement of the cradle when the cam follower 92 nears its lowermost position. This means includes an adjustable screw 115, FIGS. 2 and 3, supported by a bracket 116 on the adjacent arm 63 to engage one end of a lever 117, which is pivoted at 118, and cause an adjustable screw 120, carried by the other end of the lever, to engage an actuator 121 to move it about its pivot 122 and cause its upper end 123 to force the movable cam 104 into the position shown in FIG. 3 where it will be held by the latch 107, the adjacent rod 66 having been moved downwardly with the cradle.

*Operation*

Prior to the operation of the apparatus, the solder of the supply 11 must be heated sufficiently, to convert it to a suitable molten state, after which the motors 28 are energized to drive the pumps 27 at the desired speeds to cause solder, picked up from the bottom of the supply, to flow at a given depth through the channel 20. The channel 20 is adjusted to the desired angle to create a free flowing stream of solder at a predetermined speed. At this point, it should be mentioned that the straight surface 98 of the cam member controlling the downward movement of the cradle, particularly the relative position of the wiring board held by the carriage with the angular position of the channel and the stream of solder, causes the wiring board to be parallel with this stream and to move to a certain depth in the stream.

The operator, with the carriage in the loading position, operates the hand lever 53 to the position shown in FIG. 5. This action will release a soldered board and will condition the carriage for the next board. The operator locates one edge of the wiring board in the stationary holders 45, and moves the other edge of the wiring board to be received by the movable holders 48.

At this time, the lever 53 is moved to the position shown in FIG. 4 where, through the actuation of suitable means 120, it will be temporarily latched in place. The carriage is then moved to the position above the solder bath where the weights 70, tending somewhat to counterbalance the weight supported by the cradle, permits sufficient unbalancing of this structure to assure the cam follower 92 to be guided by the surface 98 of the pair of cams 96. As previously mentioned, this action, during operation of the air cylinder 78 to rock the mechanism supporting the cradle, brings about lowering of the cradle with the carriage to position the wiring board substantially, as shown in FIG. 7, in the stream of solder so that all of the undersurface conductors of the wiring board and the adjacent leads of the components will be soldered.

It should be understood that prior to each soldering operation, the portions to be soldered are given a suitable coating of flux. After the soldering period has elapsed and the cradle actuating means is operated for its return motion under a slowing action created by the dash pot means 79–83, the cradle is moved upwardly under the control of the cam surfaces 102 and 103 acting on the cam follower 92.

Prior to the start of this movement, attention is directed to the natural raised portion of solder, indicated at 122, immediately back of the wiring board or along the front edge of the wiring board facing the stream. This is a natural condition resulting from the disturbing presence of the end of the wiring board in the stream interrupting the smooth flow of the liquid solder. This thicker, or raised portion of the solder, is utilized during the raising of the wiring board out of the stream solder which is a slow action tilting the wiring board. During the first half of the upward motion of the cradle, affected by the cam surfaces 102 and 103 to substantially slowly pivot the wiring board about its opposite end, to gradually raise the front end of the wiring board, this deeper or raised portion of the solder stream is freed to move under the wiring board at substantially the speed of the molten solder stream, to create a wiping or washing action on the undersurface conductors and component leads, to positively wipe out any existing air pockets and completely cover all portions to be soldered.

During the remaining portion of the upward movement of the cradle, the cradle is returned to its substantially level position with the cradle permitting the carriage to be moved to the loading position. At the end of the upward stroke, the adjacent rod 66, FIGS. 2 and 6, causes the latch 107 to release the cam member 104 to be returned by the spring 108 to its outward position shown in FIG. 2.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a solder coating apparatus,
 a cradle having means for holding an article to be solder coated,
 a channel for receiving a flow of molten solder,
 means for moving the cradle toward and away from said container to solder coat the article,
 adjustable means for supporting the cradle and channel at a predetermined angle which may be varied to vary the flow of solder through the channel while maintaining constant the path of movement of the cradle with respect to the channel,
 a cam follower mounted on said cradle,
 a pair of cams for engaging said cam follower to guide the movement of the cradle,
 means for pivotally mounting a first of said cams,
 means for latching the first cam in a position remote from said follower whereupon advance of the follower and cradle is controlled by the second cam,
 means operated by the advance of the cradle to position the article in the solder for releasing said latch, and
 means for pivoting said released first cam into position to engage the cam follower during movement of the cradle away from the solder.

2. An apparatus for soldering component leads to undersurface conductors of wiring boards according to claim 1 in which:
 the carriage lowering means causing the carriage to hold the wiring board in the stream of solder for a given length of time while a first end of the wiring board positioned to face the entrance end of the channel causes a raised portion to form in the stream of molten solder adjacent thereto, and
 means subsequently operable to tilt the carriage with the wiring board by raising the first end at a speed comparable to the speed of the stream of solder to free the raised portion of the stream to flow with the stream and wipe against the undersurface conductors and adjacent leads of the board.

3. An apparatus for soldering component lead connections to undersurface conductors of wiring boards comprising:
 a channel with an open top and open ends,
 means operated to fill the channel to a given depth with a stream of molten solder and to maintain a constant flow of the stream in a given direction through the channel,
 a carriage adapted to receive and removably hold a wiring board at a loading position spaced from the channel,
 means adjustable to support the carriage and the channel at a predetermined angle which may be varied by the adjustable means with respect to a horizontal plane to vary the speed of the solder through the channel,
 a cradle normally disposed at an up position,
 guides mounted on the cradle supporting the carriage and adapting it for movement thereon between the loading position and a position above the channel,
 means operable to impart spaced downward and upward movements to the cradle between its up position and a down position,
 means to guide the cradle during its downward movement to move the carriage and wiring board at said predetermined angle with respect to the horizontal plane and parallel with the stream of solder to a position where the undersurface conductors and lead connections are located in the stream of solder, and
 means operable during the upward movement of the cradle to first rock the cradle to tilt the carriage and the wiring board at an angle relative to the flow of the stream so that an end of the wiring board facing an approaching flow of the stream will rise first and the stream will perform a washing action on the undersurface conductors and leads of the board.

4. An apparatus for soldering component lead connections to undersurface conductors of wiring boards according to claim 3 in which the rocking means for the cradle includes:
 a support rockably mounted at a position spaced from the channel and having arms with aligned pivots to rockably support the cradle,
 a cam follower mounted on the cradle at a position spaced from the pivots,
 a cam mounted at a fixed position to be engaged by the cam follower and cause the cradle in its downward movement to hold the carriage with the wiring board parallel with the stream,
 a second cam for the cradle rocking means positioned to engage the cam follower during the upward movement of the cradle,
 means supporting the second cam for movement into and out of the operating position,
 means normally urging the second cam out of operating position,
 an actuator pivotally mounted on the cradle adjacent the second cam, and
 means operated near the end of the downward movement of the cradle to cause the actuator to move the second cam into operating position.

5. An apparatus for soldering component lead connections to undersurface conductors of wiring boards according to claim 3 in which the rocking means for the cradle includes:
 a support rockably mounted at a position spaced from the channel and having arms with aligned pivots to rockably support the cradle,
 a cam follower mounted on the cradle at a position spaced from the pivots,
 a cam mounted at a fixed position to be engaged by the cam follower and cause the cradle in its downward movement to hold the carriage with the wiring board parallel with the stream,
 a second cam for the cradle rocking means positioned to engage the cam follower during the upward movement of the cradle,
 means supporting the second for movement into and out of operating position,
 means normally urging the second cam out of operating position,
 an actuator pivotally mounted on the cradle adjacent the second cam,
 means operated near the end of the downward movement of the cradle to cause the actuator to move the second cam into operating position, and
 a latch mounted adjacent the second cam and actuable to hold the second cam in the operating position.

6. An apparatus for soldering component lead connections to undersurface conductors of wiring boards according to claim 3 in which the rocking means for the cradle includes:

a support rockably mounted at a position spaced from the channel and having arms with aligned pivots to rockably support the cradle, a cam follower mounted on the cradle at position spaced from the pivots, a cam mounted at a fixed position to be engaged by the cam follower and cause the cradle in its downward movement to hold the carriage with the wiring board parallel with the stream, a second cam for the cradle rocking means positioned to engage the cam follower during the upward movement of the cradle, means supporting the second cam for movement into and out of operating position, means normally urging the second cam out of operating position, an actuator pivotally mounted on the cradle adjacent the second cam, means operated near the end of the downward movement of the cradle to cause the actuator to move the second cam into operating position, a latch mounted adjacent the second cam and actuable to hold the second cam in the operating position, and an actuator mounted to move with the cradle and operable to release the latch from the second cam near the end of the upward movement of the cradle.

7. An apparatus for soldering component lead connections to undersurface conductors of wiring boards according to claim 3 in which the rocking means for the cradle includes:

a support rockably mounted at a position spaced from the channel and having arms with aligned pivots to rockably support the cradle, a cam follower mounted on the cradle at a position spaced from the pivots, a cam mounted at a fixed position to be engaged by the cam follower and cause the cradle in its downward movement to hold the carriage with the wiring board parallel with the stream, a second cam for the cradle rocking means positioned to engage the cam follower during the upward movement of the cradle;

means supporting the second cam for movement into and out of operating position, means normally urging the second cam out of operating position, an actuator pivotally mounted on the cradle adjacent the second cam, means operated near the end of the downward movement of the cradle to cause the actuator to move the second cam into operating position, and an assisting cam member mounted at a fixed position and having a surface free of the follower during the downward movement of the cradle but cooperating with the second cam to provide a curved groove for the upward movement of the follower.

References Cited in the file of this patent

UNITED STATES PATENTS

| | | |
|---|---|---|
| 1,787,141 | Carroll | Dec. 30, 1930 |
| 2,579,634 | Warren | Dec. 25, 1951 |
| 2,875,717 | McWilliams | Mar. 3, 1959 |
| 2,964,007 | Buffington | Dec. 13, 1960 |
| 3,000,342 | Dorosz et al. | Sept. 19, 1961 |
| 3,037,274 | Hancock | June 5, 1962 |

FOREIGN PATENTS

| | | |
|---|---|---|
| 712,109 | Great Britain | July 21, 1954 |